(12) United States Patent
Haupt et al.

(10) Patent No.: US 6,737,499 B2
(45) Date of Patent: May 18, 2004

(54) PROCESS FOR THE PRODUCTION OF POLYAMIDE

(75) Inventors: Heinrich Haupt, Krefeld (DE); Dieter Göbbels, Kempen (DE); Konrad Triebeneck, Bergisch Gladbach (DE); Andreas Gittinger, Krefeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 6 days.

(21) Appl. No.: 10/146,370

(22) Filed: May 15, 2002

(65) Prior Publication Data
US 2002/0188099 A1 Dec. 12, 2002

(30) Foreign Application Priority Data

May 21, 2001 (DE) .......................... 101 24 580

(51) Int. Cl.⁷ .................... C08G 69/16; C08G 69/14; C08F 6/00
(52) U.S. Cl. ..................... 528/323; 528/310; 528/480; 528/481; 528/499
(58) Field of Search ................. 528/310, 323, 528/480, 481, 499

(56) References Cited

U.S. PATENT DOCUMENTS

| | | | | |
|---|---|---|---|---|
| 5,077,381 A | | 12/1991 | Dellinger | 528/323 |
| 5,218,080 A | | 6/1993 | Dellinger | 528/323 |
| 5,597,888 A | * | 1/1997 | Nielinger et al. | 528/335 |
| 5,646,191 A | | 7/1997 | Wiltzer et al. | 521/49.8 |
| 5,703,204 A | * | 12/1997 | Gittinger et al. | 528/486 |
| 5,902,553 A | | 5/1999 | Wiltzer et al. | 422/131 |
| 5,973,105 A | * | 10/1999 | Wiltzer et al. | 528/323 |
| 6,320,021 B1 | * | 11/2001 | Hildenbrand et al. | 528/499 |
| 6,429,279 B1 | * | 8/2002 | Hunger et al. | 528/310 |

* cited by examiner

Primary Examiner—P. Hampton Hightower
(74) Attorney, Agent, or Firm—Joseph C. Gil; Gary F. Matz; Aron Preis

(57) ABSTRACT

A process for using low-molecular weight compounds that are water-extracted from (co)polyamides in the production of polyamide is disclosed. The process entails reacting these compounds with 10 to 15 wt. % water for a period of 3.5 to 6 hours at a temperature of 220° C. to 270° C., and polymerizing the resulting product along with caprolactam.

9 Claims, No Drawings

PROCESS FOR THE PRODUCTION OF POLYAMIDE

FIELD OF THE INVENTION

The present invention relates to the treatment of low-molecular compounds extracted from polyamide 6 or from copolyamides based on caprolactam and to a process for the production of polyamide 6 or copolyamides based on caprolactam.

SUMMARY OF THE INVENTION

A process for using low-molecular weight compounds that are water-extracted from (co)polyamides in the production of polyamide is disclosed. The process entails reacting these compounds with 10 to 15 wt. % water for a period of 3.5 to 6 hours at a temperature of 220° C. to 270° C., and polymerizing the resulting product along with caprolactam.

BACKGROUND OF THE INVENTION

Polyamides, their production and their use as industrial plastics are known. They are described, for example, in "Kunststoff-Handbuch" [Plastic Handbook] Volume 3, "Technische Thermoplaste" [Industrial Thermoplastics] Part 4, "Polyamides" "edited by G. W. Becker and D. Braun and published by Hanser-Verlag Munich and Vienna, 1998.

The present invention relates to polyamide 6 and copolyamides based on caprolactam. Polyamide 6 is the homopolymer of caprolactam. Copolyamides based on caprolactam according to the present invention are copolyamides, which contain at least 50 wt. % monomer units derived from caprolactam. These copolyamides based on caprolactam also contain other recurrent units bound by amide groups. These can, for example, be recurrent units, which are derived from adipic acid and hexamethylene diamine, in other words polyamide 6,6 units. They may also be other recurrent units, which derive from other dicarboxylic acids and other diamines. Or they may be recurrent units, which derive from aminocarboxylic acids, for example the recurrent units of polyamide 11 or polyamide 12.

Polyamide 6, or copolyamides based on caprolactam (hereinafter referred to as (co)polyamides), may be produced by various processes. They may be produced, for example, by hydrolytic polymerization of caprolactam. This is the main industrial process. It is also the process preferred according to the present invention. They may also be produced by alkaline lactam polymerization. The processes for the production of (co)polyamides are described, for example, on pages 22 to 75 of Vol. 3, "Industrial Thermoplastics", Part 4 "Polyamides", of the abovementioned Plastic Handbook.

(Co)polyamides are normally produced by hydrolytic polymerization of caprolactam. If copolyamides based on caprolactam are to be produced, the required comonomers for this are added. The comonomers are preferably either mixtures of dicarboxylic acids and diamines or aminocarboxylic acids or lactams.

Hydrolytic polymerization, as described for example in Vol. 3 "Industrial Thermoplastics", Part 4 "Polyamides" Chapter 2.2.2.2.4 of the abovementioned Plastic Handbook, generally occurs as polymerization under normal pressure, normally by the addition of 1 to 5 wt. % water at temperatures normally of 240 to 270° C., excluding atmospheric oxygen. It may be started with dehydrating compounds such as aminocarboxylic acid or AH salt (salt of adipic acid and hexamethylene diamine). It is normally started with water. Here the molecular weight of the polyamide is predetermined by the water content, but in practice it is usefully stabilised, for example by carboxylic acids or amines.

(Co)polyamides are normally produced continuously. This continuous production normally takes place in vertical tube reactors, (known as SC tubes (SC=simplified continuous)). The process is normally as follows: the aqueous caprolactam (optionally together with comonomers and optionally together with other auxiliary substances such as e.g. molecular weight regulators) is poured into the top of the SC tube. Excess water is distilled off here to achieve sufficiently high molecular weights. The melt thus obtained then normally flows through the tube for 15 to 30 hours at atmospheric pressure, being kept at a temperature normally of 240 to 270° C. At the end of the SC tube, the polyamide melt is extruded into a water bath through round-hole nozzles, using a gear pump for example, cooled and then granulated.

Low-molecular compounds form as a by-product of the production of (co)polyamides. These are, in particular, oligomeric compounds, which form from caprolactam and optionally also from the comonomers. These low-molecular compounds have a detrimental effect on the properties of the polyamide 6 or the copolyamides based on caprolactam and are therefore normally removed. In particular, the cyclic dimer of caprolactam has a detrimental effect on the properties of (co)polyamides.

The effect of the low-molecular portions is that products, such as e.g. injection-moulded bodies and similar, produced from the polyamides are detrimentally affected by the diffusion of the low-molecular portions on the surface, forming a greasy film. The low-molecular portions diffused on the surface also impair the surface appearance of the products produced from the polyamides. The gloss is reduced and the colour impression impaired.

The low-molecular compounds may be removed, for example, by extraction. Extraction is normally carried out with water or with liquids that contain mostly water.

After polymerization and subsequent extraction, the polyamide 6, or copolyamide based on caprolactam, obtained is normally dried. This is done, for example, at temperatures of 90 to 130° C. in an inert gas stream. Nitrogen, for example, may be used. By increasing the drying temperature, for example to 180 to 190° C., the molecular weight of the polyamide may be further increased for special applications by so-called secondary condensation.

Apparatus with multi-stage SC tubes may also be used instead of the single-stage SC tube disclosed above.

For economic reasons it is desirable, and also known in the prior art, to return the low-molecular compounds extracted from the polyamide to the process for the production of (co)polyamides.

The water from extraction, charged with the low-molecular compounds, is normally reprocessed for this purpose. This may be done, for example, in such a way that the water, or at least the majority of the water, is removed by distillation. A mixture of caprolactam, its oligomers and other low-molecular compounds extracted from the polyamide then remains in the distillation sump. This mixture contains, in particular, a very high proportion of cyclic dimer of caprolactam.

This mixture may be reprocessed by various methods. The mixture may, for example, be polymerized discontinuously with further caprolactam in an autoclave. The mixture may also be added, in polymerization to polyamide 6 or to copolyamides based on caprolactam, to an SC tube for example.

The following is known on this subject:

U.S. Pat. No. 5,077,381 discloses a process for the hydrolysis of components extracted from polymerized caprolactam at temperatures of 220° C. to 290° C. and residence times of 2 to 6 hours in the presence of 20% water.

EP-A 0 608 454 discloses a similar process. EP-A 0 608 454 discloses a process for the depolymerization of polyamide 6 waste by hydrolysis, a temperature of 280° C., a residence time of 3 hours and an overpressure, determined by the water content, of 8.5 bar being preferred.

The disadvantage of the processes known from the prior art is, in particular, that the cyclic dimer of caprolactam polymerizes into the polyamide only very slowly. As a consequence of this, (co)polyamides, that are obtained by adding a certain proportion of the concentrated extract from polyamide production along with caprolactam and optionally comonomers during their polymerization, have a higher proportion of low-molecular compounds, in particular a higher proportion of cyclic dimers of caprolactam, when they leave the polymerization stage than is the case with polyamides, to which no proportion of concentrated extract from polyamide production is added for polymerization.

DETAILED DESCRIPTION OF THE INVENTION

Accordingly the object of the present invention is to provide a process for polymerizing concentrated extract of (co)polyamides, alone or with other monomers to form (co)polyamides, with the product thus obtained being substantially free of low-molecular compounds, in particular cyclic dimers of caprolactam.

This object is achieved by reacting low-molecular compounds extracted from (co)polyamides with 10 to 15 wt. % water for a period of 3.5 to 6 hours at a temperature of 220° C. to 270° C.

The polymerization of caprolactam to polyamide 6 in two-stage SC-reactors as well as one-stage SC reactors is known from the prior art (see for example the Plastic Handbook cited above, Vol. 3, Industrial Thermoplastics, Part 4, Polyamides, Chapter 2.2.3.2.2, pages 67 to 68). However this process also has the disadvantage that, as a consequence of the proportional use of the concentrated extract from polyamide production as a raw material, the proportion of low-molecular compounds, and in particular the proportion of cyclic dimers of caprolactam is higher after polymerization, than it is if no concentrated extract is used as a proportional raw material.

The process according to the invention has the advantage of yielding a product with a low content of cyclic dimer of caprolactam using relatively low quantities of water and pressures and thus simple and inexpensive apparatus. This is true even when the educt (low-molecular components extracted from (co)polyamides) has a high content of cyclic dimers of caprolactam.

Less water is used according to the invention than in the process according to U.S. Pat. No. 5,077,381. The process according to the invention operates at a lower temperature than the temperature preferred in EP-A 0 608 454. In addition, the effect according to the invention of effectively reducing the proportion of cyclic dimer of caprolactam by the specifically selected process parameters of the process according to the invention, is surprising as the cyclic dimer of caprolactam is known to be difficult to hydrolyse. This is documented, for example in the above-mentioned Handbook and also in Makromolekulare Chemie [Macromolecular Chemistry] Vol. 3, pages 154 if, published in 1959. There the following is given (in l/h) for the velocity constant of hydrolysis with 7.72 normal hydrochloric acid at 110° C.:

| | |
|---|---|
| for caprolactam: | greater than 2 |
| for the cyclic dimer of caprolactam: | 0.02 |
| for the trimer and tetramer: | 0.2 |
| for polyamide 6: | 0.36 |

The following processes are preferred according to the invention:

A process comprising reacting oligoamides with 10 to 15 wt. % water for a period of 3.5 to 6 hours at a temperature of 220° C. to 270° C.

A process comprising reacting cyclic dimer of caprolactam with 10 to 15 wt. % water for a period of 3.5 to 6 hours at a temperature of 220° C. to 270° C.

Process, wherein the temperature of 220° C. to 240° C. at the beginning of the reaction is increased to 250° C. to 270° C. at the end.

Process for the production of (co)polyamides comprising one of the abovementioned processes.

Process as stated, additionally comprising the polymerization of the product of the process in a single- or multi-stage SC tube, caprolactam additionally being added to the polymerization in the SC tube.

Here the said product and caprolactam are preferably in a mass ratio of 1 to 4 to 1 to 2.5, in particular 1 to 2.6 to 1 to 3.

Polymerization is preferably carried out in a two-stage SC tube.

Polyamides according to the invention are selected from the group consisting of polyamide 6 and copolyamides based on caprolactam, which contain at least 90 wt. % monomer units based on caprolactam. The remaining 10 wt. % are preferably derived from the recurrent units of polyamide 6,6 of polyamide 11 or of polyamide 12.

According to the invention, polyamide 6 is preferred in particular.

EXAMPLES

The following examples show, that the process according to the invention produces polyamide having a low content of cyclic dimer of caprolactam, although a dimer-rich mixture of low-molecular compounds that were water-extracted from polyamide 6, is used as the educt.

The exemplified reactions were carried out in an apparatus that contained a first stage where low-molecular components that were water-extracted from polyamide 6 (referred to as extract) are reacted with water, and a subsequent two-stage SC tube of conventional construction. The examples were carried out continuously. The numerical values given are ranges, within which the measured values fluctuated over an operating period of several days.

The contents of caprolactam and dimeric caprolactam were determined by HPLC. The extract was weighed after evaporation.

The mixture fed into the reactor contained 88 to 92 wt. % extract and 12 to 8 wt. % water (the sum of the two components amounted to 100%). At the intake end the temperature was maintained at 220° C. to 240° C. and at the outlet the temperature was maintained at 250° C. to 270° C. Accordingly a pressure of 20 to 25 bar was set. The residence time in stage 1 was 3.5 to 6 hours.

Caprolactam was added to the product of the first stage and this mixture was polymerized in the SC tube. The weight ratio of extract to caprolactam was 1 to 4 to 1 to 2.5. It was predominantly 1 to 2.8.

The content of dimer before the first stage was 4 to 7 wt. %.

The content of extract after the first stage was 9 to 12 wt. %, the dimer content 0.8 to 1.5 wt. %.

After the SC tube, the proportion of extract was 9 to 10%, the dimer content 0.5 to 0.8 wt. %.

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

What is claimed is:

1. A process for the production of (co)polyamides comprising obtaining low-molecular weight compounds by water-extraction of (co)polyamides and reacting said compounds with 10 to 15 wt. % water for a period of 3.5 to 6 hours at a temperature of 220° C. to 270° C.

2. The process of claim 1 wherein the compounds comprise oligoamides.

3. The process of claim 1 wherein the compounds comprise cyclic dimers of caprolactam.

4. The process according to claim 1 wherein the reacting is carried out initially at 220° C. to 240° C. and finally at 250° C. to 270° C.

5. A process for the production of (co)polyamides comprising obtaining low-molecular weight compounds by water-extraction of (co)polyamides, reacting said compounds with 10 to 15 wt. % water for a period of 3.5 to 6 hours at a temperature of 220° C. to 270° C. to obtain a product and polymerizing the product in its mixture with caprolactam.

6. The process according to claim 5, wherein the polymerization is carried out in a single- or multi-stage SC tube.

7. The process according to claim 5 wherein product and caprolactam are present in a weight ratio of 1–4 to 1–2.5 therebetween.

8. The process according to claim 7 wherein the weight ratio is 1–2.6 to 1–3.

9. The process according to claim 5 wherein the polymerization is carried out in a two-stage SC tube.

* * * * *